D. MYERS.
PNEUMATIC STREET CAR.

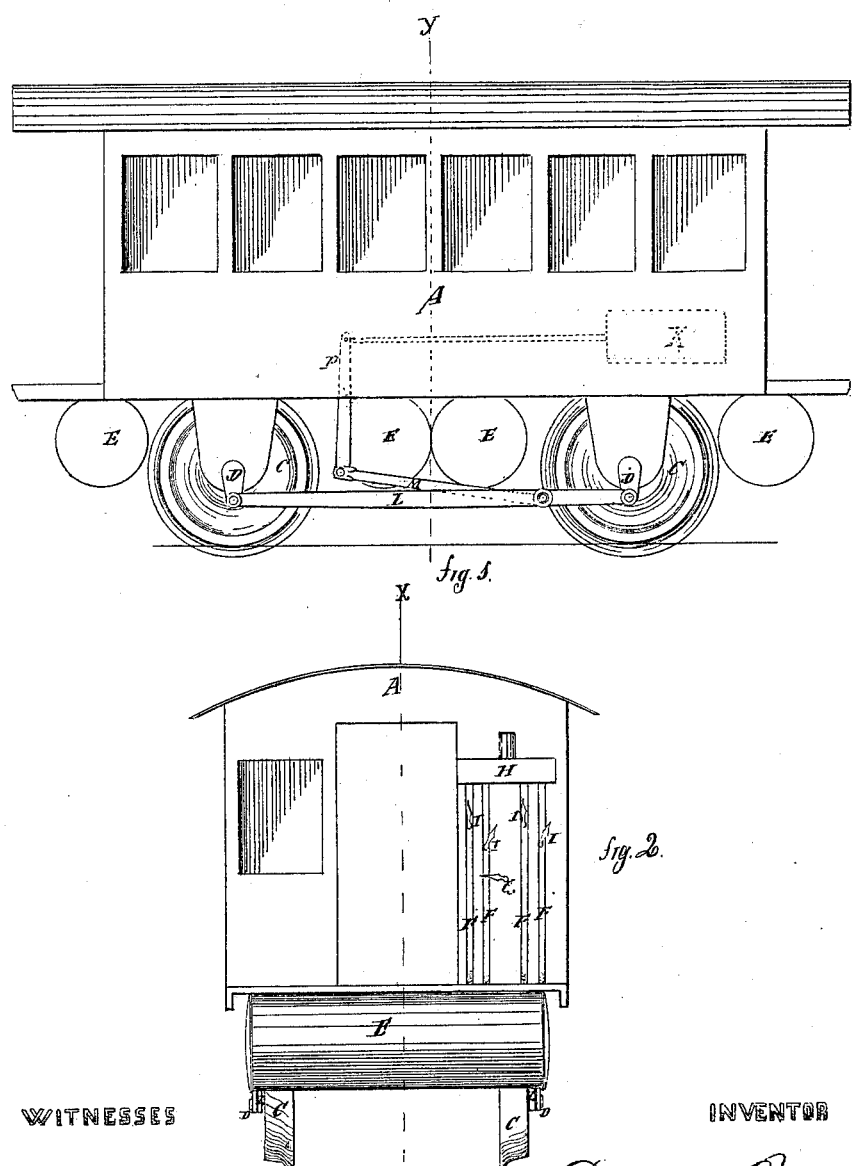

No. 108,380. Patented Oct. 18, 1870.

WITNESSES
Heinr. Bruns
L. L. Coburn

INVENTOR:
David Myers

United States Patent Office.

DAVID MYERS, OF CHICAGO, ILLINOIS.

Letters Patent No. 108,380, dated October 18, 1870.

IMPROVEMENT IN PNEUMATIC STREET-CARS.

The Schedule referred to in these Letters Patent and making part of the same.

I, DAVID MYERS, of Chicago, in the county of Cook and State of Illinois, have invented a new and useful Improvement in "Pneumatic Street-Cars;" and I do hereby declare the following to be a full, clear, and exact description of the same, reference being had to the accompanying drawing which forms a part of this specification.

Nature and Object of the Invention.

My invention consists of the combination and arrangement of the air-tanks and pipes, with their valves and cylinders, in a street railway-car, as hereafter fully described, whereby the compressed air is controlled to propel the car.

The object of this combination and arrangement is to enable the operator to operate the car from the platform thereof, and use the air from either tank separately, or from two or more of them jointly, to obtain the required power.

My invention also consists in a novel device for operating the cut-off valve. The valve operates like other cut-off valves, and is operated from the piston-rod by the intervention of a single piece, as hereafter described.

Description of the Drawing.

Figure 1 represents a side elevation of the car.
Figure 2, an end elevation.

Figure 3:
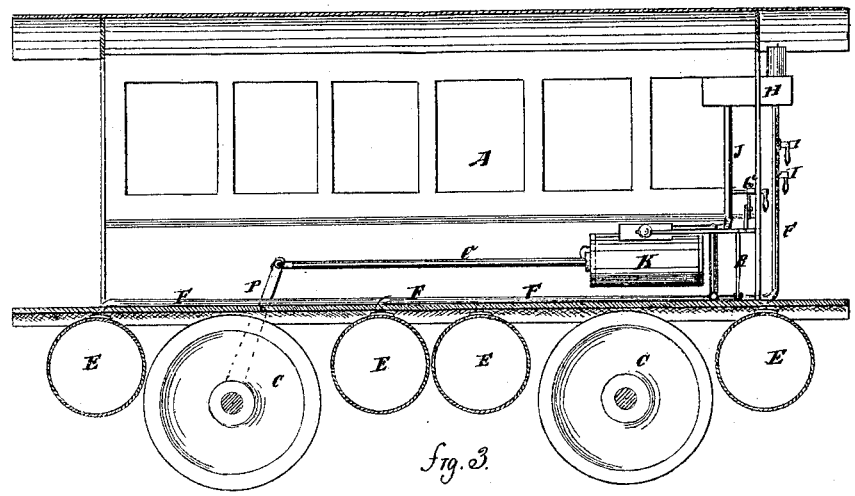
Figure 3, a longitudinal vertical section, taken at the line $x$.
Figure 4:
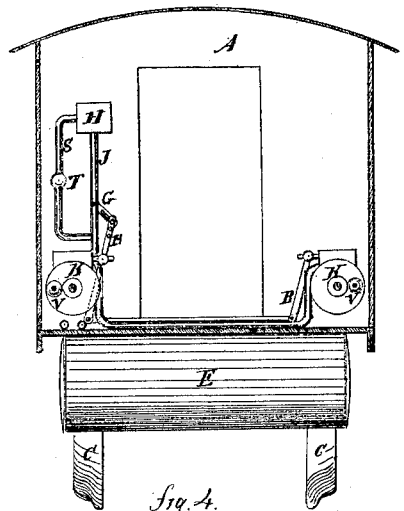
Figure 4, a transverse section, taken at the line $y$.
Figure 5:
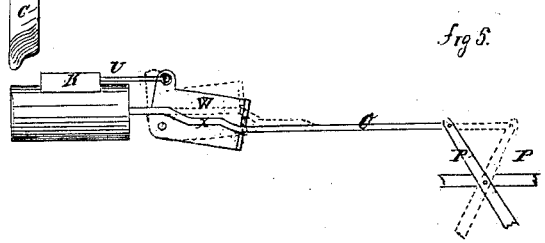
Figure 5, a detached view of one of the engine cylinders.

General Description.

A represents any ordinary street-railway car.
C, the car-wheels, and
D, a crank, attached to the car-axle.
E are tanks placed beneath the car, and made sufficiently strong to hold air compressed from one hundred to three hundred pounds to the inch.
F are pipes extending from each of the tanks E to the chamber H, and
I are the valves in said pipes, conveniently located so that the operator can open and close them as desired.
J is a pipe leading from the chamber H to the cylinders K, or rather, the steam-chest of the engine-cylinders K.
The piston-rods O are attached to the levers P, which are coupled to the pitmen-rods M, and they in turn to the bar L.
The bar L is simply a connecting-bar, coupling together the cranks D.
Q is a valve in the pipe J, and to it the rods R are attached, which open and close the blow-off of the engine-cylinders; and they are so attached that when the valves are opened to let the compressed air through into the chest of the cylinder, the blow-off is opened, and when the valve is closed the blow-off is closed.

S is a pipe extending from the pipe J below the valve Q into the chamber H, and it has a valve, T, so arranged that air can be forced up through it into the chamber H, and the tank then open, but not through it in the opposite direction.

I operate the cut-off rod U by attaching it to a vibrating piece W, pivoted to the car, as shown, which pivoted piece is vibrated by the strokes of the piston-rod.

The piston-rod plays through a slot in the piece W, and is so bent or formed that it vibrates it and operates the cut-off.

The cut-off and port-holes are constructed and arranged as in any of the known styles of steam engines.

To operate these cars, the air is forced into the tanks till the required quantity is taken; and to accomplish this, there should be stations along the route of the car, or at each end of the route, where suitable apparatus is arranged for that purpose.

To start the car, the operator simply opens one of the valves I, and the valve G, which admits air from one of the tanks to the engine-cylinders K, and operates the engine to propel the car the same as if steam were admitted instead of compressed air.

When the air is so much used from that tank that there is not sufficient power to start the car, but enough to run it after it is started, the air can be let on from another tank to start the car, and shut off again after it is started; and so on till the air is all used out of the tank, when it may be shut off, and air used from another tank; and so on till the air from all the tanks is used.

When it is desired to stop the car, for instance, at a street-crossing, the valve G is closed, and at the same time the blow-off of the engine-cylinders, as above described, and the brakes are applied; but the car is never stopped instantly, and as it moves, the revolution of the wheels causes the pistons to operate in the engine-cylinders, and at each stroke to draw air through the valves V, and, the blow-off being closed, forces it up through the pipe S, the valve T allowing it to pass up but not down through that pipe into the tank E, from which air is being used. The momentum of the car, while it is being stopped, is used to pump air for propelling the car.

Claims.

1. The combination and arrangement in a street-railway car of the air-tanks E, pipes F, provided with valves I, air-chamber H, pipes J, and engine-cylinders K, when constructed and operating substantially as and for the purposes set forth and shown.

2. The combination and arrangement of the cut-off rod U, vibrating piece W, and piston-rod O, when constructed and operating substantially as and for the purposes described.

DAVID MYERS.

Witnesses:
L. L. COBURN,
HANS BRUNS.